3,398,084
PREPARATION OF SILICA-ALUMINA COMPOSITES FOR USE IN THE HYDROCRACKING OF HYDROCARBONS
Peter Desmond Holmes, Old Greenwich, Conn., and Robert Chalmers Pitkethly, Camberley, and Alan Richard Thornhill, Epsom, England, assignors to The British Petroleum Company Limited, London, England, a corporation of Great Britain
No Drawing. Filed May 12, 1965, Ser. No. 455,300
Claims priority, application Great Britain, May 15, 1964, 20,268/64
10 Claims. (Cl. 208—111)

This invention relates to a process for the production of catalysts and to hydrocarbon conversion processes using these catalysts.

In the provisional specification of co-pending U.K. patent application No. 9559/64 made by The British Petroleum Company Limited, Robert Chalmers Pitkethly, Kenneth Hugh Bourne and Arnold Fisher on March 6, 1964, and in its companion co-pending U.S. application Ser. No. 434,118, filed Feb. 19, 1965 by the said Robert Chalmers Pitkethly, Kenneth Hugh Bourne and Arnold Fisher and assigned to The British Petroleum Company Limited, a process was described for the production of an isomerisation catalyst comprising contacting a solid oxide of an element of Group IV of the Periodic Table, or a material containing such an oxide, the oxide having hydrogen atoms in surface hydroxyl groups capable of ionising and exchanging, with an ionic solution of a salt of a metal of Group III of the Periodic Table under conditions such that ions of the Group III metal are incorporated onto the surface of the oxide.

In said co-pending U.S. application Ser. No. 434,118, the solid oxide of an element of Group IV is silica and, according to said co-pending U.K. patent application No. 9559/64, the presence of the Group III metal on the surface of the Group IV element oxide may be demonstrated, for example, by diethyl ether adsorption tests using the adsorption technique described by Pitkethly and Goble in "Actos du Deuxieme Congres International de Catalyse" Edition Technip, p. 1851 (Paris 1960).

Preferably the ionic solution is an aqueous solution.

Preferably the catalyst is prepared by percolating an aqueous solution of the Group III metal salt through a bed of the oxide of the Group IV element. Alternatively the catalyst may be prepared by treating the oxide with an excess of the salt in solution form.

The support may then be extracted with a suitable solvent, preferably water, until no more salt is washed from the support.

Preferably the bed is composed of particles having a surface area greater than 200 sq. metres per gram.

Preferably the solution has an initial concentration not less than M/10.

Preferably contacting is continued until 0.1 to 3% wt. expressed as percent by wt. of the Group IV metal oxide of the Group III metal ion is incorporated onto the surface of the oxide, the amount depending on the surface area and porosity of the oxide.

Preferably the solution has an initial pH in the range 2 to 3.5, being less than that at which the hydroxide is formed.

Preferably the solution is contacted with the oxide at a temperature in the range 0° to 100° C.

Certain combinations of Group III metal ions with Group IV oxides are particularly advantageous, namely aluminium on silical gel, gallium on titania and indium on zirconia.

The preferred aluminium salt is aluminium sulphate.

Other suitable salts include organic complexes of aluminium, e.g., aluminium tris-acetylacetonate. These may be employed in solutions having higher values of pH than those hitherto stated to be preferable, e.g., up to 7.0.

The silica gel may be prepared from an aqueous solution of a soluble inorganic or organic silicate by hydrolysis. A gel formed in this way will contain hydrogen atoms in surface hydroxyl groups capable of ionising and exchanging.

The Group III metal ions, the source of activity, are on the surface of Group IV element oxide, the support, and are thus readily accessible to reacting molecules and the active sites are evenly distributed over a given surface provided that the Group III metal ion content does not exceed the higher value in the preferred range hereinbefore stated. If this value is exceeded, the possibility exists that the Group III metal ions might form clumps of the corresponding Group III metal oxide on the surface of the Group IV element oxide.

The materials prepared according to the above process were found to be suitable catalysts for the isomerisation of olefins, both skeletal isomerisation and double bond shifting being catalysed.

It has now been found that the material prepared in accordance with said co-pending U.K. application No. 9,559/64 is a suitable support material for catalysts, and according to the present invention catalysts are prepared by incorporating a catalytic component with the material prepared according to the above-mentioned co-pending application.

A wide range of catalytic components may be incorporated with the support material and the catalytic activity displayed by the final catalyst will depend upon the particular component or components incorporated with the support. Suitable materials include metals, and compounds, e.g., oxides thereof, of Groups I, II, and V–VIII of the Periodic Table. In particular hydrogenating/dehydrogenating components selected from Group VI and Group VIII metals and their compounds may be incorporated to give active catalysts for hydrogenation and dehydrogenation reactions. Platinum group metals are particularly preferred components, especially platinum and palladium, and catalysts containing these latter metals and prepared according to the present invention are particularly suitable as hydrocracking catalysts. Hydrocracking is the term now commonly used to describe the hydrocatalytic conversion of high boiling hydrocarbons to produce lower boiling materials. Catalyst compositions may also be prepared according to the present invention having activity, for example, for isomerisation, polymerisation and reforming.

Isomerisation, both skeletal and double-bond shifting, is promoted by a catalyst according to the present invention containing chromium, zinc, cobalt or nickel. Dealkylation, particularly demethylation, and polymerisation are promoted by a nickel-containing catalyst; and reforming is promoted by a platinum-containing catalyst.

The catalytic component may be present in an amount between 0.1 and 50% weight based on the final catalyst depending on the actual component and the type of reaction to be catalysed. Platinum group metals are preferably incorporated in amounts between 0.01 and 10% weight, particularly 0.1 to 5% weight.

The catalysts may be prepared according to the present invention in any one of the following ways:

Class 1: The support comprising at least in part oxides of Group IV metals treated with a solution of a salt of a Group III metal is impregnated with the catalyst component.

Class 2: The Group IV oxide is first impregnated with the catalyst component and subsequently treated with the Group III metal salt.

Class 3: The Group III metal salt treated support has the catalyst components incorporated therewith by an ion exchange procedure.

Class 4: The Group IV oxide is ion exchanged with the catalyst component prior to treatment with the Group III metal salt.

The Group IV oxide in the support is preferably silica and the Group III metal salt is preferably an aluminium salt, for example aluminium sulphate. Other Group IV oxides are suitable, however, for example titania and zirconia. Suitable other Group III metal salts include for example salts of gallium and indium. The treatment of the Group IV metal oxide with the Group III metal salt is fully described in said co-pending U.K. application No. 9,554/64.

The present invention includes hydrocarbon conversion processes using catalysts prepared in accordance with the above description and particularly processes for hydrocracking, isomerisation, polymerisation and reforming.

Suitable feedstocks to hydrocracking processes include hydrocarbon fractions, e.g., petroleum fractions containing more than 50% volume boiling above 250° C., particularly those containing more than 50% volume boiling between 370–600° C. Wax distillates are particularly preferred feedstocks, but gas oils are also suitable. The feedstocks may be derived directly from a crude oil or they may be products from a previous treatment, e.g., a thermal or catalytic cracking step. The feedstocks may also be pretreated as necessary for the removal of non-hydrocarbon impurities, for example sulphur, nitrogen or oxygen. Suitable hydrocracking conditions are as follows:

Temperature_____ °F., 450–950.
Pressure_____ p.s.i.g., 250–3,000, preferably 1,000–2,500.
Space velocity____ v./v./hr., 0.2–5.0, preferably 0.4–2.0.
Hydrogen rate____ s.c.f./b., 1,000–20,000, preferably 5,000–15,000.

The invention is illustrated with reference to the following examples:

Example 1

20 ml. of a nominal 1 percent aqueous solution of palladous chloride was contacted with an aluminium sulphate treated silica gel and the mixture allowed to stand for 4 hours. Excess solution was then decanted from the solid and the latter, after drying overnight at 120° C., was reduced for 2 hours at 500° C. in a stream of hydrogen flowing at 1,000 v./v./hr.

The resulting catalyst was active for hydrocracking.

Example 2

20 ml. of an acidified (pH=1.5) 1 percent solution of palladous chloride was contacted with 10 ml. of silica gel and the mixture allowed to stand for 4 hours. Excess solution was then decanted off and the resulting solid dried overnight at 120° C. It was then transferred to a suitable reactor and reduced for 2 hours at 500° C. in a stream of hydrogen flowing at 1,000 v./v./hr.

After reduction the catalyst was allowed to cool and was then transferred to a glass column where M/10 aluminium sulphate solution was allowed to percolate through it until the pH of the eluate reached that of the feed solution. The resulting catalyst was removed from the column and excess aluminium sulphate washed from it in an 8 hour water extraction process performed in a Soxhlet apparatus. After drying overnight at 120° C. the catalyst was reduced at 500° C. for 2 hours in a hydrogen flow of 1,000 v.v./hr.

Analysis of preparation.—Palladium wt. percent 0.60, aluminium wt. percent 0.58, sodium wt. percent 0.004.

The resulting catalyst was active for hydrocracking.

Example 3

A molar solution of sodium acetate, pH=8.4, was allowed to percolate slowly through a 5 ml. bed of an aluminium sulphate-treated silica gel, contained in a suitable column, until the pH of the eluate approached that of the feed solution. The gel was then removed from the column and given a wash with deionised water to remove excess sodium acetate from between the particles of silica. The gel was then contacted with 15 ml. aliquots of an acidified (pH=2.0) 0.1 percent solution of palladous chloride, the aqueous material being rejected prior to the addition of the next aliquot. The processes were repeated until the pH of the particular aliquot in contact with the silica reached 4.0. The gel was then washed with water and returned to the column where 2 litres of acetic acid solution (pH—3.5) were allowed to percolate slowly through it. The gel was finally removed from the column and extracted with water for 8 hours in a Soxhlet apparatus, dried at 110° C. overnight and reduced at 500° C. for 2 hours in a hydrogen flow of 1000 v./v./hr.

The resulting catalyst was active for hydrocracking.

Example 4

A 5 ml. sample of silica gel was placed in a suitable column and a 3 molar solution (pH=8.5) of sodium acetate allowed to percolate through the bed until the eluate pH approached that of the feed solution. The gel was then removed from the column and washed with deionised water to remove surplus sodium acetate from the gel particles; it was then contacted with an acidified (pH—2.0) solution of palladous chloride. After leaving the solution in contact with the gel for half an hour, excess solution was decanted from the solid which was then washed with deionised water to remove excess palladium chloride solution.

The gel was then returned to the column and an M/10 solution of aluminium sulphate percolated through the bed until the pH of the eluate approached that of the feed solution. The resulting catalyst was then transferred to a Soxhlet apparatus and submitted to an exhaustive extraction (8 hours) with water.

After drying overnight at 110° C. the catalyst was reduced for 2 hours at 500° C. in a 1000 v./v./hr. flow of hydrogen.

Analysis of preparation.—Pd percent wt. 0.63, Al percent wt. 0.45, Na percent wt. 0.018.

The resulting catalyst was active for hydrocracking.

Example 5

One gram of a silica/alumina was contacted with 200 ml. of a 3M solution of potassium carbonate and the mixture allowed to stand overnight. The solid was then exhaustively extracted with water for 8 hours in a Soxhlet apparatus. The washed silica/alumina was then contacted overnight with 25 ml. of a 1 percent solution of acidified (pH=2) palladous chloride solution. The resulting material was washed with water several times and the washings rejected; it was next dried at 110° C. in an air oven and reduced at ca 400° C. for 2 hours in a stream of hydrogen flowing at 1000 v./v./hr.

The reduced catalyst was contacted overnight with M/10 aluminium sulphate solution, after which the aqueous layer was removed by decantation and the solid transferred to a column where 2 litres of molar acetic acid were percolated slowly through it.

After removing surplus acetic acid by an exhaustive (8 hour) extraction with water in a Soxhlet apparatus, the resulting catalyst was dried overnight at 110° C. and then reduced for 2 hours at 500° C. in a 1000 v./v./hr. flow of hydrogen.

The resulting caalyst was active for hydrocracking.

The hydrocracking activities of the catalysts prepared in Examples 1–5 are summarised in the following Tables 1 and 2, together with the results obtained with other catalysts prepared according to the present invention. The tables are arranged in groups of catalysts classified according to the method of preparation classes (1–4) as hereinbefore described. The catalysts were derived from a number of different silica-containing bases designated A–G in the tables.

The silicas were treated in the form of 60–100 mesh or 72–100 mesh granules (except where stated) by techniques similar to those described in Examples 1–4. In the case of the palladium exchanged catalysts (Classes 3 and 4) the palladium had to be exchanged via the exchanged sodium salt. This technique was not necessary with the nickel catalysts. All catalysts were given a final water extraction (in some cases after an acetic acid extraction).

Hydrocracking activity tests were carried out under the following conditions (after activation for 1½ hours in a hydrogen flow of 2000 GHSV at 500° C.):

| | |
|---|---|
| Feed | $C_{10}$–$C_{13}$ n-paraffins. |
| Feedrate | 2 v./v./hr. |
| Pressure | Atmospheric. |
| Temperature | 300° C. |
| $H_2$ rate | 500 v./v./hr. (GHSV). |
| Run duration | 3 hours. |

Results are expressed in terms of the weight percent yield of $C_4$ hydrocarbons (giving a measure of the extent of hydrocracking), the molar ratio of $iC_4/nC_4$ (butanes plus butenes) (giving a measure of the isomerization activity) and the molar ratio of butanes/butenes (giving a measure of the hydrogenation activity).

The results for Pd-containing catalysts (Table 1) showed that preparations by Class 1 produced catalysts having low Pd contents and were thus low in activity. Pd catalysts (Class 2) could be readily prepared with the desired Pd and Al contents and had a high activity. The Class 2 catalyst containing 0.39% weight Pd and 1.1% weight Al was also used in a pilot plant hydrocracking test using Jari Wax Distillate as feed under the following conditions.

| | | |
|---|---|---|
| Feedrate | v.v./hr | 1 |
| Pressure | p.s.i.g. | 1,000 |
| Temperature | ° F. | 750 |
| $H_2$ recycle rate | s.c.f./b. | 10,000 |

The results showed a conversion of 37.0 percent weight to material boiling lower than that of the feed (177° C.).

Pd catalysts (Class 3 and 4) showed moderate activity provided the palladium contents were above ca 0.2 percent weight. The effect of the low metal content is also reflected by the hydrogenation activity.

Table 2 shows the results of nickel-containing catalysts (Classes 1, 2 and 3) and a Pt-containing catalyst (Class 2). Various other Ni and Pt-containing catalysts are shown for comparison.

TABLE 1.—SUMMARY OF HYDROCRACKING DATA OVER PALLADIUM CATALYSTS

| Class | Classification or Type | Catalyst Analysis (percent wt.) | | | Hydrocracking Activity Test | | | Example |
|---|---|---|---|---|---|---|---|---|
| | | Pd | Al | Na | $C_4$ Yield | $i$-$C_4$/$n$-$C_4$ | Butanes/Butenes | |
| 1 | Pd impregnated, Al exch $SiO_2$ (A) | 0.10 | 0.21 | 0.011 | 0.06 | 3.92 | 0.35 | 1 |
| | Pd impregnated, Al exch $SiO_2$ (C) | 0.06 | 0.35 | 0.008 | 0.09 | 5.9 | 0.30 | |
| | Pd impregnated, Al exch $SiO_2$ (E), Prep. from tetrammine palladous chloride | 1.19 | 1.0 | 0.008 | 1.22 | 1.64 | >50.0 | |
| 2 | Al exchanged, Pd impregnated $SiO_2$ (B) | 0.60 | 0.58 | 0.004 | 1.62 | 2.31 | 5.9 | 2 |
| | Al exchanged, Pd impregnated $SiO_2$ (E), Prep and used as 72–100 mesh | 0.44 | 1.7 | 0.006 | 3.97 | 2.54 | 28.0 | |
| | Al exchanged, Pd impregnated $SiO_2$ (E) Prep as 8–16; used as 72–100 | 0.39 | 1.1 | 0.010 | 4.54 | 2.51 | 19.0 | |
| | Al exchanged, Pd impregnated $SiO_2$ (E), Prep and used as 8–16 mesh | 0.39 | 1.1 | 0.010 | 4.16 | 2.49 | 14.0 | |
| | Al exchanged, Pd impregnated $SiO_2$ (E) | 0.78 | 1.7 | 0.020 | 5.68 | 1.88 | 20.0 | |
| | Al exchanged, Pd impregnated $SiO_2$ (E), Prep and used as 72–100 mesh | 0.73 | 2.1 | 0.015 | 3.72 | 1.76 | 6.11 | |
| 3 | Pd exchanged (via Na acetate), Al exchanged $SiO_2$ (C)* | 0.21 | 0.31 | 0.014 | 1.46 | 2.27 | 6.5 | 3 |
| | Pd exchanged (via Na sulphate), Al exchanged $SiO_2$ (C)* | 0.02 | 0.07 | 0.006 | <0.01 | | | |
| | Pd exchanged (via Na acetate), Al exchanged $SiO_2$ (B)* | 1.06 | 0.78 | 0.003 | 1.69 | 2.59 | 37.0 | |
| | Pd exchanged (via Na acetate), Al exchanged $SiO_2$ (B) | 0.55 | 1.8 | 0.006 | 1.49 | 2.55 | >50.0 | |
| 4 | Al exchanged, Pd exchanged (via Na acetate) $SiO_2$ (C) | 0.63 | 0.45 | 0.018 | 1.29 | 2.43 | 9.1 | 4 |
| | Al exchanged, Pd exchanged (via Na acetate) $SiO_2$ (C) | 0.36 | 0.44 | 0.018 | 1.07 | 2.40 | 7.9 | |
| | Al exchanged, Pd exchanged (via Na sulphate) $SiO_2$ (C) | 0.47 | 0.40 | 0.010 | 0.73 | 1.86 | 2.2 | |
| | Al exchanged, Pd exchanged (via Na sulphate $SiO_2$ (B) | 0.05 | 0.51 | 0.008 | 0.14 | 7.3 | 0.71 | |
| | Al exchanged, Pd exchanged (via Na acetate $SiO_2$ (B) | 0.05 | 0.53 | 0.006 | 0.27 | 3.31 | 0.51 | |
| | Al exchanged, Pd ex_hanged (via Na acetate) $SiO_2$ (B) | 0.61 | 1.4 | 0.004 | 2.14 | 2.36 | 9.1 | |
| | Al exchanged, Pd exchanged (via Na acetate) $SiO_2$ (E) | 0.98 | 0.81 | 0.005 | 4.25 | 2.36 | 15.0 | |
| | Al exchanged, Pd exchanged (via Na acetate) $SiO_2$ (E) (8–16 mesh) | 0.41 | 0.39 | 0.018 | 0.55 | 2.04 | 4.8 | |
| | Al exchanged, Pd exchanged (via Na acetate) $SiO_2$ (E)*(8–16 mesh) | 0.39 | 0.37 | 0.007 | 0.70 | 1.92 | 9.9 | |
| | Al exchanged, Pd exchanged (via $K_2CO_3$) $SiO_2$-$Al_2O_3$ (G)* | 1.17 | 3.2 | 0.015 | 1.64 | 1.83 | 2.8 | |
| | Al exchanged, Pd exchanged (via Na acetate) $SiO_2$(E), Prep. as 8–16; used as 72–100 mesh. | 0.65 | 0.43 | 0.31K. / 0.020 | 2.09 | 2.23 | 7.0 | |
| Other | $SiO_2$ (E) | (1) | 0.048 | 0.028 | <0.01 | | | 5 |
| | Al exchanged $SiO_2$ (A) | (1) | 0.3 | | 0.21 | 6.3 | 0.73 | |
| | Pd impregnated $SiO_2$ (B) | 0.43 | (1) | 0.004 | <0.01 | | | |
| | Pd impregnated $SiO_2$ (E) | 0.44 | 0.056 | 0.039 | <0.10 | (2) | (3) | |
| | Silica-alumina (F) | (1) | 5.0 | 0.007 | 0.67 | 6.4 | 1.1 | |
| | Pd exchanged $SiO_2$-$Al_2O_3$ (F) | 0.67 | | | 1.31 | 2.01 | 9.3 | |

*Catalyst given final acetic acid extraction (otherwise water extraction).
[1] Nil.  [2] Very low.  [3] High.

TABLE 2.—SUMMARY OF HYDROCRACKING DATA OVER Ni AND Pt CATALYSTS

| Class | Classification or Type | Catalyst Analysis, percent wt. | | | Hydrocracking Activity Test | | |
|---|---|---|---|---|---|---|---|
| | | Ni | Al | Na | $C_4$ Yield | i-$C_4$/n-$C_4$ | Butanes/Butenes |
| 1 | Ni formate impregnated, Al exchanged $SiO_2$ (D) | 3.1 | 0.14 | 0.012 | 0.65 | 0.07 | >50 |
| | Ni nitrate impregnated, Al exchanged $SiO_2$ (E) | 1.4 | 2.2 | 0.019 | 0.43 | 4.94 | 1.3 |
| | Ni nitrate impregnated, Al exchanged $SiO_2$ (E) | 3.9 | 1.5 | 0.014 | 2.35 | 1.40 | 7.3 |
| | Ni formate impregnated, Al exchanged $SiO_2$ (E) | 4.7 | 2.2 | 0.015 | 4.01 | 1.31 | 7.8 |
| 2 | Al exchanged, Ni nitrate impregnated $SiO_2$ (E) | 0.32 | 1.3 | 0.015 | 2.52 | 1.89 | 3.9 |
| | Al exchanged, Ni formate impregnated $SiO_2$ (E) | 5.2 | 0.42 | 0.008 | 3.61 | 1.40 | 19.0 |
| 3 | Ni sulphate exchanged, Al exchanged $SiO_2$ (E) | 1.3 | 1.2 | 0.007 | 3.76 | 1.35 | 5.8 |
| | Ni sulphate exchanged, Al exchanged $SiO_2$ (E) | 0.68 | 0.86 | 0.01 | 2.45 | 1.61 | 4.08 |
| | Ni sulphate exchanged, Al exchanged $SiO_2$ (E) | 0.93 | 1.8 | 0.01 | 1.82 | 1.93 | 2.77 |
| 4 | Al exchanged, Ni sulphate exchanged $SiO_2$ (E) | 0.90 | 0.51 | 0.006 | 1.88 | 1.97 | 6.44 |
| Others | $SiO_2$-$Al_2O_3$ (F) | (¹) | 5.0 | 0.007 | 0.67 | 6.41 | 1.1 |
| | $SiO_2$ (E) | (¹) | 0.048 | 0.028 | <0.01 | --- | --- |
| | Ni formate impregnated $SiO_2$-MgO | 9.9 | --- | --- | 0.98 | 0.02 | >50 |
| | Ni formate impregnated $SiO_2$ (D) | 4.8 | 0.018 | 0.019 | 1.31 | 0.02 | --- |
| | Ni formate impregnated $SiO_2$-$Al_2O_3$ (F) | 6.3 | 5.0 | --- | 4.08 | 2.11 | 17 |
| | Ni nitrate impregnated $SiO_2$ (E) | 0.50 | 0.066 | 0.275 | 0.19 | 0.03 | >50 |
| | Ni sulphate exchanged (via Na acetate) $SiO_2$ (E) | 1.1 | 0.046 | 0.004 | 0.56 | 0.08 | >50 |
| | Ni nitrate exchanged $SiO_2$-$Al_2O_3$ (F) | 0.28 | --- | --- | 0.71 | 6.25 | 1.4 |
| | Ni nitrate impregnated $SiO_2$-$Al_2O_3$ (F) | 2.0 | --- | --- | 1.98 | 2.31 | 2.5 |
| 1 | Al exchanged, Pt impregnated $SiO_2$ (E) | ²0.31 | 1.3 | --- | 0.89 | 1.71 | >50 |
| 2 | Al exchanged, Pt impregnated $SiO_2$ (E) | ²0.37 | 1.1 | 0.003 | 0.94 | 2.04 | >50 |
| | Al exchanged, Pt impregnated $SiO_2$ (E) | ²0.45 | 1.6 | 0.027 | 3.26 | 2.51 | >50 |
| Others | Pt impregnated $SiO_2$ (E) | ²0.42 | --- | --- | <0.01 | (³) | (⁴) |
| | Pt impregnated $SiO_2$-$Al_2O_3$ (F) | ²0.53 | --- | --- | 1.01 | 2.09 | >50 |
| | Pt impregnated $Al_2O_3$ | ²0.74 | --- | 0.008 | 0.35 | <0.01 | >50 |
| | Pt impregnated $SiO_2$-$Al_2O_3$ (F) | ²0.50 | --- | --- | 1.39 | 2.47 | >50 |

¹Nil.  ² Platinum.  ³ Low.  ⁴ High.

Example 6

Catalysts active for reforming reactions may also be prepared according to the invention. Table 3 shows the results of reforming n-hexane over an aluminium exchanged, platinum impregnated silica gel (Class 2) compared with an Al-free catalyst. The results show the ability of the catalyst to promote isomerization, dehydrocyclization and dehydrogenation reactions. Due to the fact that the experiment was carried out at atmospheric pressure, the Al exchanged catalyst suffered considerably more from carbon-laydown with the result that at the higher temperatures the conversions at 1 hour on stream appeared to be less. Normally, of course, this catalyst would be used with a hydrogen pressure of at least 200 p.s.i.g.

Example 7

A saturated solution of magnesium sulphate was contacted with a 5 ml. sample of an aluminium sulphate-treated silica gel and the mixture allowed to stand overnight. Excess solution was decanted from the solid which was then removed to a Soxhlet apparatus and exhaustively extracted with water for 8 hours to remove all adsorbed magnesium sulphate.

Analyses of solid.—Prior to Mg sulphate treatment: Al percent wt. 0.29, Mg percent wt. not detected, i.e. less than 0.01. After Mg sulphate treatment: Al percent wt. 0.29, Mg percent wt. 0.17. The resulting catalyst was active for olefin isomerisation (double bond and skeletal).

Example 8

The hydrocracking experiments using n-$C_{10}$–n-$C_{13}$ feed also revealed that significant amounts of paraffin isomerization was occurring under the conditions used (300° C., 2 v./v./hr., atmospheric pressure). Table 4 gives the results expressed as the yield of $C_{10}$-$C_{13}$ isomers obtained with various Pd-containing catalysts. Nickel- and Platinum-containing catalysts similarly gave some isomerized products.

TABLE 3

Pressure: Atmospheric; Feed: n-Hexane, 99.5% pure; Feedrate: 1 v./v./hr.; $H_2$/HC mo ratio; 4:1; Catalyst: 2 ml. of 72-100 mesh; Samples taken at 45-60 minutes on stream.

| | Catalyst | | | | | | | |
|---|---|---|---|---|---|---|---|---|
| | Platinum impregnated $SiO_2$ (E) | | | | Aluminium exchanged, Platinum impregnated $SiO_2$ (E) | | | |
| Reaction Temperature, ° C | 400 | 450 | 500 | 550 | 400 | 450 | 500 | 550 |
| Product Analyses (by GLC), percent wt.: | | | | | | | | |
| $C_1$-$C_4$ hydrocarbons | 3.7 | 3.3 | 8.2 | 6.6 | 4.5 | 9.6 | 5.0 | 8.4 |
| $C_5$ paraffins | 1.9 | 1.6 | 3.7 | 0.5 | 1.4 | 2.4 | 0.8 | 0.3 |
| iso-Hexanes | 8.9 | 5.4 | 4.1 | 1.1 | 46.3 | 32.7 | 11.8 | 1.7 |
| n-Hexane | 69.7 | 67.6 | 40.0 | 17.3 | 23.5 | 18.1 | 49.4 | 55.9 |
| Methylcyclopentane | 9.5 | 10.8 | 6.3 | (¹) | 5.7 | 5.7 | | |
| Cyclohexane | 1.3 | 2.2 | 3.7 | 1.0 | 2.8 | 0.8 | 2.6 | 1.0 |
| Benzene | 4.9 | 7.8 | 30.6 | 71.5 | 15.8 | 30.7 | 27.5 | 29.2 |
| Other hydrocarbons | | 1.4 | 3.4 | 2.0 | --- | (¹) | 2.9 | 3.5 |

¹ Traces.

Reforming of n-Hexane pentenes, methyl-ethylcyclopentenes and dimethylcyclohexenes) was also observed.

TABLE 5

Reactions of cis-Butene-2; Pressure: Atmospheric; Feedrate: 1,000 GHSV.

| | Catalyst | | | | |
|---|---|---|---|---|---|
| | Ni formate impregnated SiO$_2$ (D) | Ni formate impregnated SiO$_2$-Al$_2$O$_3$ (F) | Ni formate impregnated Al exchanged SiO$_2$ (D) | Ni nitrate impregnated Al exchanged SiO$_2$ (E) | Al exchanged Ni nitrate impregnated SiO$_2$ (E) |
| Class | | | 1 | 1 | 2 |
| Percent wt. Ni | 4.7 | 6.5 | 4.0 | 3.9 | 0.32 |
| Percent wt. Al | | 5.0 | 1.5 | 1.5 | 1.3 |
| Run No | 28A | 24C | 29B | 31A | 30A |
| Reaction Temperature, °C | 300 | 306 | 301 | 309 | 313 |
| Activities: | | | | | |
| cis-trans Isomerisation [1] | 91 | 96 | 94 | 96 | 96 |
| Double Bond Isomerisation [1] | 55 | 90 | 85 | 89 | 88 |
| Skeletal Isomerisation [1] | 0 | 3 | 0 | 11 | 12 |
| Polymer Yield, percent wt | 1 | 23 | 3.3 | 41 | 33 |
| Polymer Composition, C$_8$ Hydrocarbons | | 83.9 | 93.6 | | |
| C$_8$ Composition: [2] | | | | | |
| Trimethylpentenes | | 0.4 | ([3]) | | |
| Dimethylhexenes | | 41.2 | 8.3 | | |
| Methylheptenes | | 43.4 | 48.5 | ([4]) | ([4]) |
| n-Octenes | | 6.9 | 19.3 | | |
| Cyclic C$_8$HCS | | 8.1 | 23.9 | | |

[1] Percentage approach to equilibrium concentration of isomer.
[2] Determined from GLC analysis of hydrogenated product.
[3] Nil.
[4] Mainly dimethylhexenes.

TABLE 4.—ISOMERISATION OF PARAFFINS

Feed: C$_{10}$-C$_{13}$ n-Paraffins; Feedrate: 2 v./v./hr.; Pressure: Atmospheric; Temperature: 300° C.; Hydrogen rate: 500 v./v./hr.

| Class | Catalyst | Isomerisation Percent Weight of C$_{10}$-C$_{13}$ Isomers |
|---|---|---|
| 1 | Pd impregnated, Al exchanged SiO$_2$ (E) | 44.2 |
| 2 | Aluminium exchanged, Palladium impregnated SiO$_2$ (E) | 13.1 |
| 3 | Palladium exchanged (via Na acetate), Aluminium exchanged SiO$_2$ (B)* | 13.1 |
| 3 | Palladium exchanged (via Na acetate), Aluminium exchanged SiO$_2$ (B) | 14.9 |
| 4 | Aluminium exchanged, Palladium exchanged (via Na acetate) SiO$_2$ (C) | 5.8 |
| 4 | Aluminium exchanged, Palladium exchanged (via Na acetate) SiO$_2$ (E) | 7.5 |
| | Aluminium exchanged SiO$_2$ (A) | 0.5 |
| | Palladium impregnated SiO$_2$-Al$_2$O$_3$ (F) | 6.1 |
| | Al-exchanged, Pd impregnated SiO$_2$ (E) | 1.9 |
| 1 | Ni formate impregnated, Al exchanged SiO$_2$ (D) | 3.4 |
| 2 | Al-exchanged, Ni formate impregnated SiO$_2$ (E) | 21.4 |
| 2 | Al-exchanged Ni nitrate impregnated SiO$_2$ (e) | 1.7 |
| 3 | Ni sulphate exchanged, Al-exchanged SiO$_2$ (E) | 2.2 |
| 4 | Al-exchanged, Ni sulphate exchanged SiO$_2$ (E) | 4.6 |
| Others | Ni formate impregnated SiO$_2$ (E) | 0.7 |
| | Ni sulphate exchanged (via Na acetate) SiO$_2$ (E) | 8.4 |
| | Al-exchanged SiO$_2$ (A) | 0.5 |
| | Ni nitrate impregnated SiO$_2$-Al$_2$O$_3$ (F) | 3.1 |
| 1 | Pt impregnated Al-exchanged SiO$_2$ (E) | 36.5 |
| 2 | Al-exchanged Pt impregnated SiO$_2$ (E) | 41.8 |
| 2 | Al-exchanged Pt impregnated SiO$_2$ (E) | 25.1 |
| Others | Pt impregnated SiO$_2$-Al$_2$O$_3$ (F) | 20.0 |
| | Pt impregnated Al$_2$O$_3$ | 1.3 |

*Catalyst given an acetic acid extraction before a final water extraction (otherwise water extraction only).

Example 9

Olefin reactions were studied at atmospheric pressure with cis-butene-2 as feed (1000 GHSV) and no carrier gas at various temperatures between 50° and 500° C. Table 5 shows the results of experiments at 300° C. Activities for the isomerization reactions are expressed as the percentage approach to the equilibrium concentration of the appropriate isomer. The results show that all nickel catalysts promoted cis/trans isomerization and double bond isomerization activities. Skeletal isomerization and polymer yields were lower with catalysts impregnated with nickel formate (ammonium complex) than with nitrate. Whereas nitrate impregnated silicas gave high polymer yields consisting largely of dimethylhexenes, the nickel formate impregnated aluminium exchanged silica gave low yields of dimers but consisting mainly of methylheptenes and n-octenes. The appearance of cyclic C$_8$ hydrocarbons (possibly trimethylcyclo-

We claim:
1. A process for the production of catalysts suitable for use as hydrocracking catalysts which comprises contacting silica, having hydrogen atoms in surface hydroxyl groups capable of ionizing and exchanging, with an ionic solution of an aluminium salt at a temperature in the range 0–100° C. such that from 0.1 to 3% ions of the aluminium, expressed as percent by weight of the silica, is incorporated onto the surface of the silica, and from 0.1 to 50% weight, based on the final catalyst, of a catalytic component selected from the metals, and compounds thereof, of Groups VI and VIII of the Periodic Table, also being incorporated with the oxide.

2. A process as claimed in claim 1 wherein the aluminium salt is aluminium sulphate.

3. A process as claimed in claim 1 wherein the catalytic component is incorporated by impregnation.

4. A process as claimed in claim 1 wherein the catalytic component is incorporated by ion exchange.

5. A process as claimed in claim 1 wherein the catalytic component is a platinum group metal.

6. A process as claimed in claim 5 wherein the platinum group metal is incorporated in an amount between 0.01 and 10% weight.

7. A process for hydrocracking hydrocarbons which comprises contacting the hydrocarbon in a hydrocracking zone with a catalyst prepared by contacting silica, having hydrogen atoms in surface hydroxyl groups capable of ionizing and exchanging, with an ionic solution of an aluminium salt at a temperature in the range 0–100° C. such that from 0.1 to 3% ions of the aluminium, expressed as percent by weight of the silica, is incorporated onto the surface of the silica, and from 0.1 to 50% weight, based on the final catalyst, of a catalytic component selected from the group consisting of platinum and palladium also being incorporated with the silica, said contacting being carried out at a temperature in the range 450–950° F., a pressure of 230 to 3000 p.s.i.g., a space velocity of 0.2–5.0 v./v./hr., and a hydrogen rate of 1000 to 20,000 s.c.f./b.

8. A process as claimed in claim 7 for hydrocracking petroleum fractions containing more than 50% volume boiling above 250° C., particularly more than 50% boiling between 370° and 600° C.

9. A process as claimed in claim 8 wherein the fraction is a wax distillate.

10. A process as claimed in claim 7 wherein the process conditions include a temperature of 450–950° F., a pressure of 1000–2500 p.s.i.g., a space velocity of 0.4–

2.0 v./v./hr., and a hydrogen rate of 5000–15,000 s.c.f./b.

References Cited

UNITED STATES PATENTS

| | | | |
|---|---|---|---|
| 3,268,436 | 8/1966 | Arey et al. | 208—111 |
| 2,271,319 | 1/1942 | Thomas et al. | 208—120 |
| 2,886,511 | 5/1959 | Van Dyke et al. | 208—120 |
| 3,221,002 | 11/1965 | Orzechowski et al. | 252—455 |
| 3,248,316 | 4/1966 | Borger et al. | 208—58 |

DELBERT E. GANTZ, *Primary Examiner.*

A. RIMENS, *Assistant Examiner.*